UNITED STATES PATENT OFFICE 2,550,708

REMOVAL OF SILICA FROM ALKALINE CARBONATE BRINES

Edmond Gerald Meyer, Riverdale, Md.

No Drawing. Application September 6, 1944,
Serial No. 552,852

3 Claims. (Cl. 23—63)

(Granted under the act of March 3, 1883, as
amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the purification of alkali carbonate brines and more particularly to the removal of dissolved silica therefrom.

In accordance with this invention, silica-free alkali carbonate brines are produced by adsorption of the silica content thereof on hydromagnesite followed by separation of the silica-free solution from the silica-containing hydromagnesite residue.

Suitable alkali carbonate brines for desilication include sodium carbonate, potassium carbonate, and mixtures thereof such as for example the concentrated solutions of alkali carbonates produced by the base exchange treatment of Wyomingite with calcined trona. It has been found that hydromagnesite is peculiarly efficacious in the desilication of very concentrated alkali carbonate brines containing for example from 200 to 700 grams of alkali carbonates per liter. Such solutions have heretofore been very resistant to desilication procedures by previously known methods. However, my process is equally applicable to the desilication of dilute carbonate brines.

Preferably, the hydromagnesite employed is finely-divided to expose an extensive surface for adsorption of silica. The hydromagnesite is preferably employed in excess, since it has been found that the degree of desilication secured is generally related to the amount of hydromagnesite employed. In general, from 0.01 to 10.0 moles of hydromagnesite are usually employed per liter of alkali carbonate brine being treated. Preferably the amount of hydromagnesite employed is maintained within the more restricted range of 0.02 to 2.0 moles of hydromagnesite per liter of alkali carbonate brine being treated. A large excess of hydromagnesite does no harm, since it is insoluble in the alkali carbonate brine and then removes the silica quantitatively. The hydromagnesite can be prepared by any suitable process, such as by treatment of soluble magnesium salt, for example magnesium sulfate, with an alkali carbonate, such as for example, sodium carbonate, potassium carbonate or preferably a portion of the alkali carbonate brine produced by my process. After the treatment of the soluble magnesium salt with the alkali carbonate, hydromagnesite (having the formula

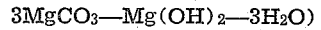

$3MgCO_3-Mg(OH)_2-3H_2O)$ is precipitated in the finely divided state and is, after washing, free of soluble salts, ready for use in the desilication of the alkali carbonate brines.

The alkali carbonate solution is treated with hydromagnesite at a temperature between the freezing point and the boiling point of the solution, but is preferably treated at ordinary atmospheric temperature, that is, at a temperature not higher than 40 degrees centigrade in general. Low temperatures favor removal of silica in my process.

While my invention is not to be limited by any theory of reaction X-ray diffraction analysis indicates that the silica is removed by a process of adsorption on the hydromagnesite and that no magnesium silicate formation or other chemical changes take place.

Preferably, the desilication is carried out in a cyclic, continuous manner. For example, a solution of magnesium sulfate or other soluble magnesium salt is treated with a solution of sodium carbonate, potassium carbonate or a mixture of alkali carbonates produced in the process itself, and a finely-divided precipitate of hydromagnesite is thereupon filtered from the solution. The hydromagnesite precipitate is then washed free of sulfate ions or other acidic ions introduced by the magnesium salt, and it is then ready for use as a treatment reagent in the desilication of the alkali carbonate brines. To accomplish the desilication, it is only necessary to incorporate the thus-prepared hydromagnesite into the alkali carbonate brine and agitate the resulting mixture. After a suitable time of contact, such as for example 15 minutes to one hour or longer, the precipitate, containing adsorbed silica, is filtered or otherwise separated from the brine, and the silica-free brine of alkali carbonates can then be worked up in any desired fashion. The silica-containing hydromagnesite is characterized by an X-ray diffraction pattern of typical molecular silica and molecular hydromagnesite. The silica-containing hydromagnesite is then treated with an acid, usually a strong mineral acid, such as for example nitric acid, hydrochloric acid or preferably sulfuric acid, to regenerate the soluble magnesium salt from the residual silica. The resulting soluble magnesium salt is then separated from the silica residue and returned for further use in the process as before.

The following illustrative example, in which parts and percentage compositions are by weight unless otherwise designated, shows how the invention may be carried out, but it is not limited thereto. Temperatures are on the centigrade scale:

Example

A solution of ordinary epsom salt was mixed with an excess of a solution of soda ash containing about 200 grams per liter of soda ash. Hydromagnesite was immediately precipitated from the solution, was filtered off and washed free of sulfate with water. Thereafter, the hydromagnesite in the amount designated in the table below was incorporated with a strongly alkaline carbonate brine having the composition indicated in the table below. The silica content before and after desilication was as indicated in the table.

| Test No. | Basic $MgCO_3$, Mole/l. | $SiO_2$, Grams/l. | | $Na_2CO_3$, Grams/l. | $K_2CO_3$, Grams/l. |
|---|---|---|---|---|---|
| | | Before desil. | After desil. | | |
| 1 | 0.0128 | 9.0 | 0.90 | 168.8 | 61.2 |
| 2 | 0.0193 | 9.0 | 0.75 | 168.8 | 61.2 |
| 3 | 0.0225 | 9.0 | 0.65 | 168.8 | 61.2 |
| 4 | 0.0257 | 9.0 | 0.60 | 168.8 | 61.2 |
| 5 | 0.0106 | 7.90 | 1.15 | 145.5 | 119.6 |
| 6 | 0.0224 | 7.90 | 0.85 | 145.5 | 119.6 |
| 7 | 0.0316 | 7.90 | 0.60 | 145.5 | 119.6 |
| 8 | 0.0425 | 7.90 | 0.55 | 145.5 | 119.6 |
| 9 | 0.0532 | 7.90 | 0.45 | 145.5 | 119.6 |
| 10 | 0.0708 | 7.90 | 0.40 | 145.5 | 119.6 |
| 11 | 0.0887 | 7.90 | 0.35 | 145.5 | 119.6 |
| 12 | 0.1064 | 7.90 | 0.33 | 145.5 | 119.6 |
| 13 | 0.0105 | 6.40 | 1.25 | 200.4 | 92.6 |
| 14 | 0.0183 | 6.40 | 0.95 | 200.4 | 92.6 |
| 15 | 0.0262 | 6.40 | 0.80 | 200.4 | 92.6 |
| 16 | 0.0191 | 7.00 | 1.05 | 153.0 | 139.0 |
| 17 | 0.0191 | 7.62 | 1.00 | 153.0 | 139.0 |
| 18 | 0.0284 | 9.00 | 0.85 | 153.0 | 139.0 |
| 19 | 0.0286 | 8.20 | 0.80 | 153.0 | 139.0 |
| 20 | 0.0382 | 9.33 | 0.72 | 153.0 | 139.0 |
| 21 | 0.0478 | 9.32 | 0.65 | 153.0 | 139.0 |
| 22 | 0.0251 | 7.00 | 1.00 | 208.0 | 122.5 |
| 23 | 0.0453 | 7.00 | 0.75 | 208.0 | 122.5 |
| 24 | 0.0932 | 6.80 | 0.55 | 208.0 | 122.5 |
| 25 | 0.0306 | 11.4 | 1.70 | 325.0 | 15.0 |
| 26 | 0.0461 | 11.4 | 1.40 | 325.0 | 15.0 |
| 27 | 0.0615 | 11.4 | 1.20 | 325.0 | 15.0 |
| 28 | 0.0790 | 11.4 | 1.10 | 325.0 | 15.0 |
| 29 | 0.1024 | 11.4 | 0.88 | 325.0 | 15.0 |
| 30 | 0.0123 | 5.50 | 1.75 | 257.0 | 141.0 |
| 31 | 0.0193 | 5.50 | 1.50 | 257.0 | 141.0 |
| 32 | 0.0257 | 5.50 | 1.40 | 257.0 | 141.0 |
| 33 | 0.0322 | 5.50 | 1.20 | 257.0 | 141.0 |
| 34 | 0.0082 | 4.96 | 1.23 | 200.0 | 118.6 |
| 35 | 0.0163 | 4.96 | 0.88 | 200.0 | 118.6 |
| 36 | 0.0220 | 4.96 | 0.78 | 200.0 | 118.6 |
| 37 | 0.0295 | 4.96 | 0.63 | 200.0 | 118.6 |
| 38 | 0.0333 | 4.96 | 0.57 | 200.0 | 118.6 |
| 39 | 0.0154 | 4.00 | 2.00 | 285.0 | 276.0 |
| 40 | 0.0233 | 4.00 | 1.85 | 285.0 | 276.0 |
| 41 | 0.0311 | 4.00 | 1.55 | 285.0 | 276.0 |
| 42 | 0.0493 | 4.00 | 1.30 | 285.0 | 276.0 |

As indicated by the foregoing, a simple and desirable adsorption process for removing silica from strongly concentrated alkali carbonate brines has been provided. The process, preferably employed in a cyclic continuous manner, provides extremely efficacious desilication employing a minimum of treatment reagent. However, quantitative desilication can readily be secured by the employment of an excess of hydromagnesite as a desilicating reagent in which case no detectable amounts of silica remain in the alkali carbonate brines. In contradistinction to previous known desilication processes, my process operates most effectively at low temperatures. My hydromagnesite treatment reagent is totally insoluble in the most diverse of strongly concentrated alkali carbonate brines and therefore introduces no impurities into the alkali carbonate brines even though employed in a very large excess. My process is particularly applicable to the treatment of very concentrated alkali carbonate brines, for which no effective desilication methods have heretofore been practicable to my knowledge.

Various changes can be made in the invention as illustrated and described since many apparently different embodiments will occur to one skilled in the art.

What is claimed is:

1. A cyclic process for the removal of silica from an alkali metal carbonate solution containing dissolved silica, which comprises bringing hydromagnesite into intimate contact with such a solution, then separating and recovering an alkali metal carbonate solution of diminished silica content, and a solid, residue comprising hydromagnesite and adsorbed silica, then treating the solid residue with an acid which forms soluble magnesium salts, to form a magnesium salt solution, separating the liberated silica, then mixing the said magnesium salt solution with recovered alkali metal carbonate solution to precipitate additional hydromagnesite, and separating the formed hydromagnesite and returning it for removal of further quantities of silica as before.

2. The process of claim 1 wherein sulfuric acid is employed to form the soluble magnesium salt, as magnesium sulfate.

3. The process of claim 1, wherein the silica adsorption step is conducted at a temperature not higher than 40 degrees centigrade.

EDMOND GERALD MEYER.

REFERENCES CITED

The following references are of record in the file of this patent:

UNITED STATES PATENTS

| Number | Name | Date |
|---|---|---|
| 968,669 | Leese | Aug. 30, 1910 |
| 1,400,542 | Harlow | Dec. 20, 1921 |
| 1,584,716 | Behrman | May 18, 1926 |
| 1,598,254 | Prutzman et al. | Aug. 31, 1926 |
| 1,751,955 | Stoewener | Mar. 25, 1930 |
| 1,959,346 | Cummins | May 22, 1934 |
| 1,984,342 | Hellmers | Dec. 11, 1934 |
| 1,992,532 | Kuhnert | Feb. 26, 1935 |
| 2,034,996 | Slocum | Mar. 24, 1936 |
| 2,057,414 | Briggs et al. | Oct. 13, 1936 |
| 2,143,069 | Hill et al. | Jan. 10, 1939 |
| 2,287,856 | Beekhuis et al. | June 30, 1942 |
| 2,346,140 | Pike | Apr. 11, 1944 |
| 2,347,053 | Houghton | Apr. 18, 1944 |

OTHER REFERENCES

Mellor: "Comprehensive Treatise on Inorganic and Theoretical Chemistry," vol. 4, pages 351, 354, 355, 364 and 365. Published by Longmans, Green & Co., 1923.

Handbook of Chem. and Physics, 22nd ed., 1937–38, pages 406, 407, 444, 445.